United States Patent [19]

Swonger

[11] Patent Number: 4,754,490
[45] Date of Patent: Jun. 28, 1988

[54] LINKED-LIST IMAGE FEATURE EXTRACTION

[75] Inventor: Claron W. Swonger, Ann Arbor, Mich.

[73] Assignee: Environmental Research Institute of Michigan, Ann Arbor, Mich.

[21] Appl. No.: 53,277

[22] Filed: May 22, 1987

[51] Int. Cl.$^4$ ............................................. G06K 9/00
[52] U.S. Cl. .......................................... 382/18; 382/50
[58] Field of Search ....................... 382/18, 21, 50, 51, 382/58; 364/414, 518

[56] References Cited

U.S. PATENT DOCUMENTS

| | | | |
|---|---|---|---|
| 4,075,604 | 2/1978 | Degasperi | 382/18 |
| 4,365,304 | 12/1982 | Ruhman et al. | 382/51 |
| 4,509,195 | 4/1985 | Nadler | 383/51 |
| 4,606,065 | 8/1986 | Beg et al. | 383/18 |
| 4,630,306 | 12/1986 | West et al. | 382/21 |

Primary Examiner—Leo H. Boudreau
Attorney, Agent, or Firm—Krass and Young

[57] ABSTRACT

The present invention is a technique for use in image processing for extracting feature information from an array of pixels. Each pixel within the array of pixels has a pixel value selected from among a plurality of possible pixel values. As the pixels are recalled from the array of pixels in a raster scan fashion a pixel address memory is incremented to contain a current pixel address indicative of the location of the current pixel. If the current pixel is the first occurrence of its pixel value, the current pixel address is stored in a first occurrence pointer memory at a memory location corresponding to the current pixel value. The current pixel address is stored within a last occurrence pointer memory at the memory location corresponding to the current pixel value. The current pixel address is stored in a memory location within a linked-list memory corresponding to a pixel address stored within the last occurrence pointer memory at a memory location corresponding to the current pixel address. This process builds within the linked-list memory a plurality of linked chains from the first occurrence of a particular pixel value, through successive occurrences of the pixel value for the entire array of pixels.

15 Claims, 5 Drawing Sheets

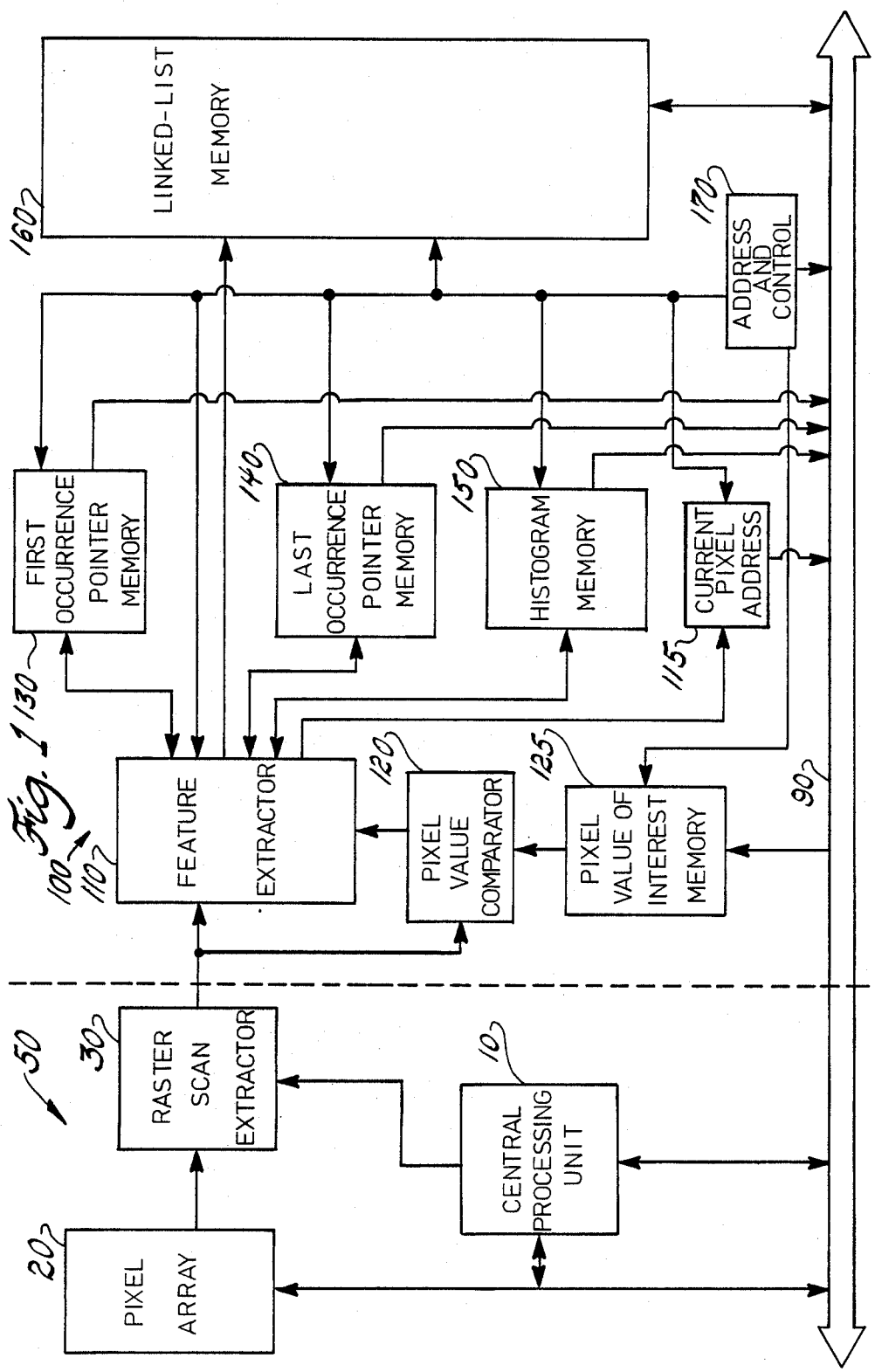

LINKED-LIST IMAGE FEATURE EXTRACTION

FIELD OF THE INVENTION

The technical field of the present application is that of image processing and more particularly that of feature extractions based upon pixel values of pixels within an array of pixels.

BACKGROUND OF THE INVENTION

Currently there are many applications which are susceptible to computer processing including images of one or more planar arrays of pixels. These field may include video, radar, multispectral and sonar data. Typically the planar array of pixels consists of digitally sampled and quantized image data. Each of these pixels in the pixel array thus has a pixel value selected from among a predetermined set of possible values.

In processing these image arrays of pixels, it is often desirable to extract information from the pixel array defining and cataloging which pixels have predetermined pixel values or ranges of values, or which pixels have pixel values of interest. Many cases of image manipulation such as machine vision systems require such defining and cataloging. This cataloging allows direct access to pixels within the image array according to their pixel values rather than according to their location within the image. This process can be understood as a transformation from image-domain or "iconic" processing to symbolic-domain processing. Such symbolic-domain processing is often employed in artificial intelligence systems. Such artificial intelligence systems are particularly useful in the processing of such image arrays. In addition, it is often useful to have a histogram of the number of occurrences of the particular pixel values or ranges of pixel values.

The image data in the planar array of pixels is normally stored, processed and transferred in a regular raster-scan sequence. Such a raster-scan sequence involves recall of the image array of pixels by rows in a regular sequence covering the entire array. It is believed that the process to sequentially interrogate, compose and catalog every pixel of a high-resolution image with a conventional general purpose computer would be extremely time consuming. Such high-resolution images may include pixel arrays of 1,000 by 1,000 pixels or more, thus including more than 1,000,000 pixels.

In view of these factors, it is therefore desirable to be able to construct a directory of the pixel locations within a planar array of pixels which have each of the possible pixel values at a rate equal to the rate at which the pixels may be supplied by available sensor image or data transmission paths. In this regard, it is considered desirable to be able to generate this catalog from the raster-scan data of the entire image. In addition it would also be desirable to simultaneously construct a histogram of all possible pixel values. Such a histogram would permit an analysis of the distribution of the values within the image.

SUMMARY OF THE INVENTION

The present invention is an apparatus and method for extracting features from a planar array of pixels from a raster-scan sequence of the pixels. The apparatus and method involves construction of a linked-list catalog of the pixel values or pixel value ranges. Each chain within the linked-list indicates the location within the planar array of pixels having a particular pixel value. This list is constructed with the use of a first occurrence memory which stores at corresponding memory locations the location within the pixel array of the first occurrence of each pixel value or pixel value range within the planar array of pixels and a last occurrence memory which stores within corresponding memory locations the location within the pixel array of the last occurrence of a particular pixel value or pixel value range so far received. With the use of these first and last occurrence memories and a current pixel address memory, the linked-list is constructed during a single raster scan of the array of pixels.

At the same time, a histogram memory can also be constructed in which each memory location stores a count of the number of pixels having a predetermined pixel value or range of pixel values previously received in accordance with the raster scan.

The linked-list thus constructed is stored in a linked-list memory. From this linked-list memory, a list of all pixel locations within the pixel array having a particular pixel value or range of values can be easily constructed. Thus, the present invention enables transformation of the array of pixels from the image-domain to the symbolic-domain in the minimum length of time required to supply the pixels to the feature extractor.

BRIEF DESCRIPTION OF THE DRAWINGS

These and other objects and aspects of the present invention can be more fully understood from the following description taken together with the figures in which:

FIG. 1 illustrates the organization of an apparatus for extraction of features from a raster scan of a pixel array;

DETAILED DESCRIPTION OF THE PREFERRED EMBODIMENT

Figure 2A:
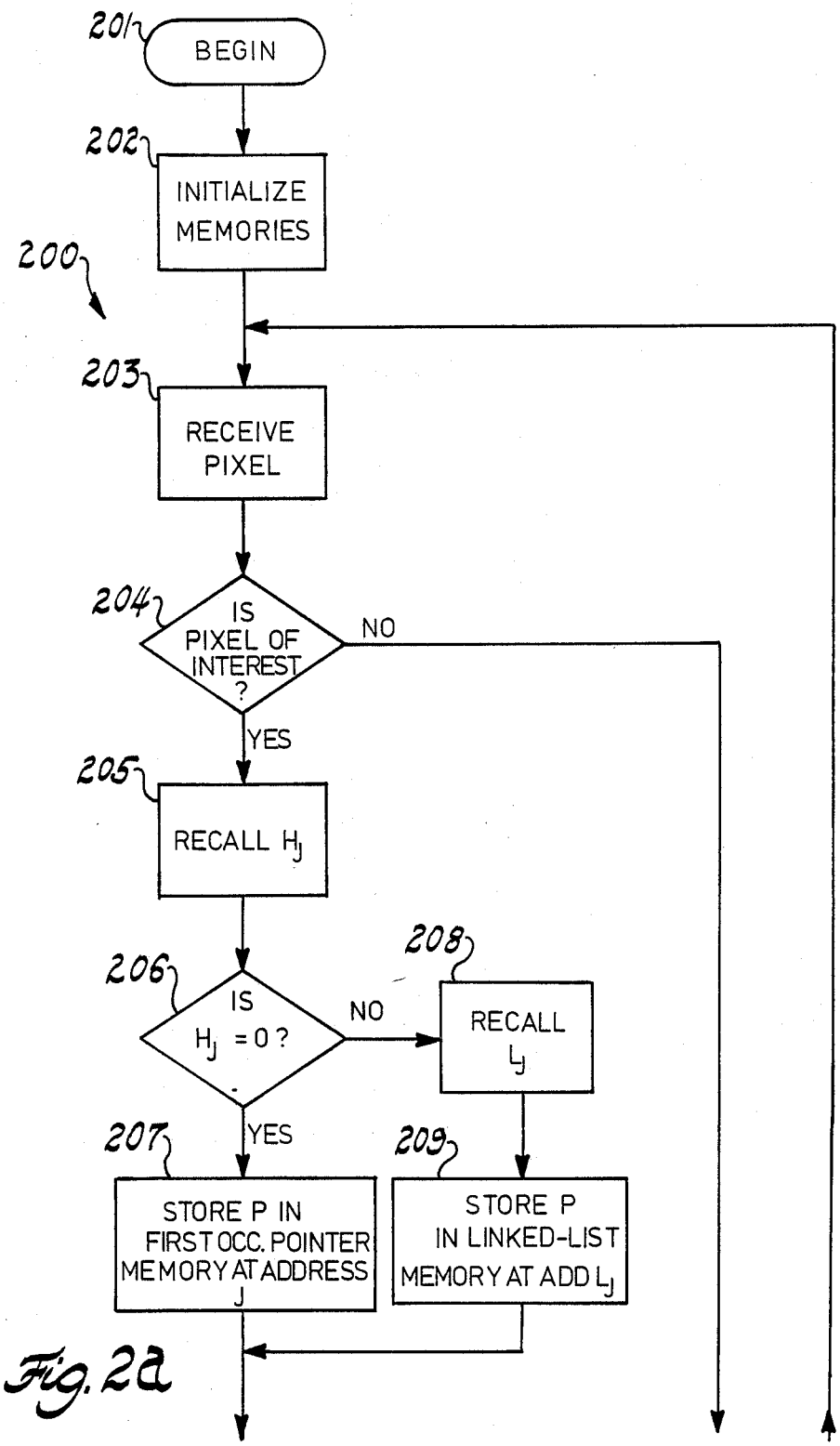
FIGS. 2a and 2b illustrate a flow chart of the process of extraction of the features from the pixel array.

FIG. 1 is divided into two parts. The first part, conventional image processor 50, includes central processing unit 10, pixel array 20 and raster scan extractor 30. The second part, feature extraction processor 100, includes feature extractor logic 110, current pixel address memory 115, pixel value comparator 120, pixel of interest memory 125, first occurrence pointer memory 130, last occurrence pointer memory 140, histogram memory 150, linked-list memory 160 and address and control circuit 170. A single common bus 90 unites the conventional processor 50 and the feature extraction processor 100.

Conventional processor 50 is constructed in accordance with the prior art. Central processing unit 10 is any computer central processing unit which can process data and control the flow of programmed algorithms. Central processing unit 10 is bidirectionally coupled to pixel array 20, wherein the planar array of pixels is stored. Both central processing unit 10 and pixel array 20 are bidirectionally coupled to common bus 90. Raster scan extractor 30 is coupled to pixel array 20 for generating a sequence of pixels corresponding to a raster scan of the pixel array 20 under the control of central processing unit 10. Conventional image processor 50 may further include additional memory units, input and output devices and so forth which are conventional and which will not be described herein.

Feature extraction processor 100 includes the apparatus to perform the present invention. Feature extractor logic 110 receives the raster scan pixel data from raster scan extractor 30. Feature extractor logic 110 controls first occurrence pointer memory 130, last occurrence pointer memory 140, histogram memory 150, current pixel address memory 115 and linked-list memory 160. Feature extractor logic 110 is coupled to address and control circuit 170 for specifying the address and the read/write state of the various memories.

During operation, feature extractor logic 110 builds a linked-list in linked-list memory 160 in accordance with the pixel values of the pixels received from raster scan extractor 30. Current pixel address memory 115 is incremented upon receipt of each pixel from raster scan extractor 30, therefore current pixel address memory 115 stores an address corresponding to the location within pixel array 20 of the last received pixel. This address stored within current pixel address 115 also corresponds to a single location within linked-list memory 160. Upon receipt of each new pixel, feature extractor logic 110 updates first occurrence pointer memory 130 (if necessary), last occurrence pointer memory 140, histogram memory 150 and linked-list memory 160. This process will be further described below.

Another aspect of feature extractor logic 110 is performed in conjunction with pixel value comparator 120. At the same time as the raster scan data from raster scan extractor 130 is applied to feature extractor logic 110 it is also applied to pixel value comparator 120. Pixel value comparator 120 compares the current value of the current pixel with the set of pixel values of interest stored within pixel value of interest memory 125. If the current pixel has a pixel value within the set of pixel values of interest stored within pixel value of interest memory 125, then pixel value comparator 120 enables feature extractor logic 110. On the other hand, if the pixel value of the current pixel is not within the set of pixel values of interest, then pixel value comparator 120 inhibits the operation of feature extractor logic 110. The use of the set of pixel values of interest stored within pixel value of interest memory 125 permits the operation to be selective with regard to the pixel values extracted from pixel array 20. The use of a set of predetermined pixel values of interest also reduces the required size of linked-list memory 160 because fewer than the total number of pixels in the pixel array 20 need be stored in linked-list memory 160.

Figure 2B:
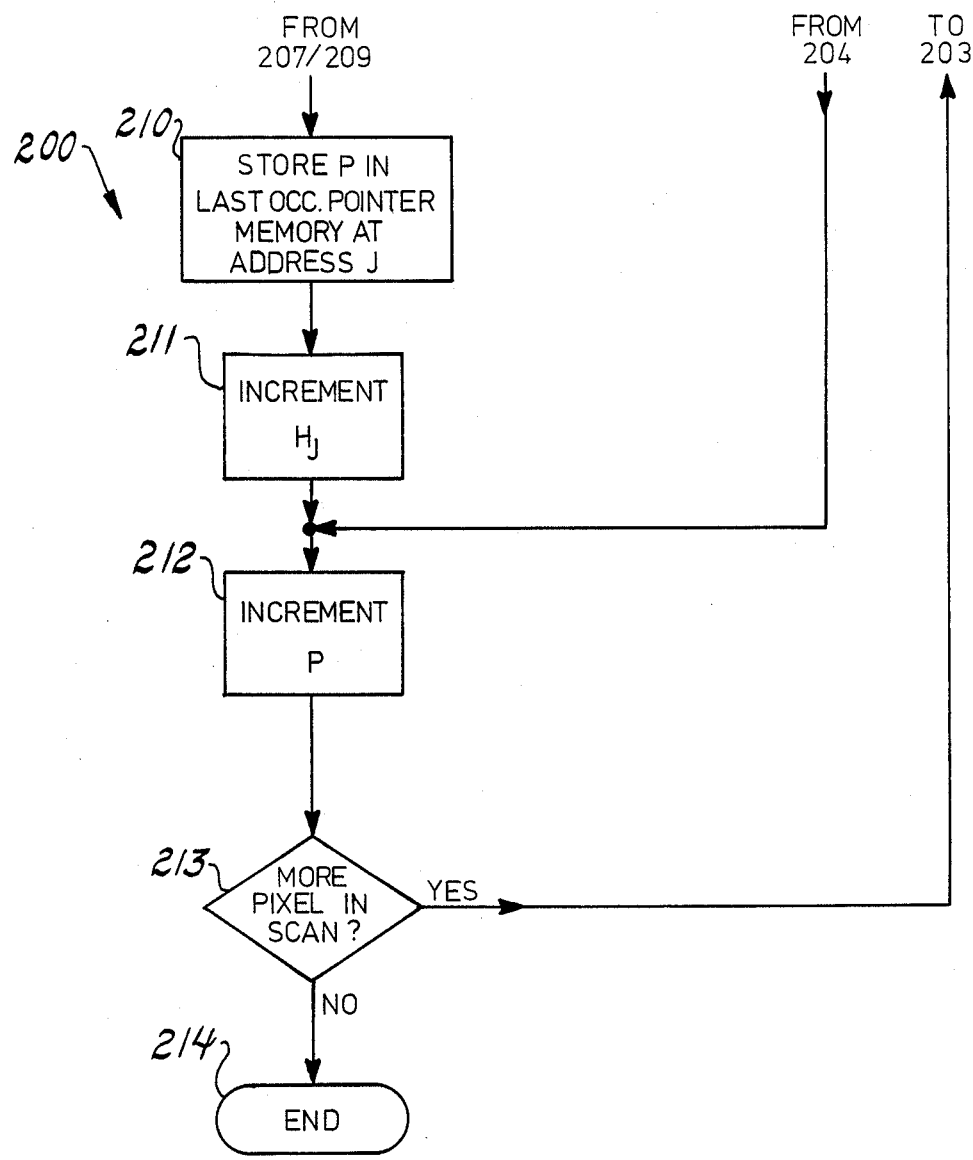

Feature extraction processor 100 operates generally in accordance with program 200 illustrated in FIGS. 2a and 2b. Note that although the following description refers to a program, the feature extraction process can be carried out by hardware logic or a suitably programmed processing unit. Program 200 does illustrate the necessary steps for practicing the present invention. Program 200 illustrated in FIGS. 2a and 2b is intended to show only the general outlines of the operation of feature extraction processor 100. Those skilled in the art would understand how to construct the feature extraction processor 100 as illustrated in FIG. 1 either as special purpose hardware logic or a programmed general purpose processor in accordance with the general outline illustrated in program 200.

Program 200 is begun via start block 201. The first action of feature extraction processor 100 is to initialize the memories (processing block 202). In this case, pixel value of interest memory 125 is loaded with the set of pixel values which are to be extracted by feature extractor logic 110. In the apparatus illustrated in FIG. 1 pixel value of interest memory 125 can be loaded from central processing unit 10 via common bus 90. The initializing of the memories includes setting current pixel address memory 115 to zero. In addition, first occurrence pointer memory 130, last occurrence pointer memory 140 and linked-list memory 160 are all completely filled with zeros during this initialization.

Feature extraction processor 100 next receives the first pixel of the pixel array from raster scan extractor 30 (processing block 203). Feature extraction processor 100 then next tests to determine whether or not the received pixel has a pixel value which is of interest (decision block 204). As previously described, pixel value comparator 120 compares the pixel value of the current pixel with the set of pixel values of interest stored in pixel value of interest memory 125. In the event that the pixel value is of interest then feature extractor logic 110 is enabled. In the event that the current pixel has a pixel value which is not of interest then the following feature extraction steps are skipped.

In the case in which the received pixel has a pixel value which is of interest, feature extractor logic 110 then recalls the data in the histogram memory $H_J$ corresponding to the pixel value J of the current pixel (processing block 205). This is accomplished via the bi-directional connection between feature extractor logic 110 and histogram memory 150. Feature extractor logic 110 tests to determine whether or not this recalled histogram value is zero (decision block 206). In the event that the recalled histogram value $H_J$ is zero, then the current pixel is the first occurrence within the sequence of raster scan pixels of the current pixel value. The current pixel address stored in current pixel address memory 115 is then stored in the first occurrence pointer memory 130 at the address corresponding to the pixel value J of the current pixel (processing block 207). This process fills first occurrence pointer memory 130 with the addresses of the first occurrence of each pixel value within pixel array 220.

If, on the other hand, the histogram value $H_J$ does not equal zero, then the current pixel is not the first occurrence of the current pixel value. In this event, the last occurrence address $L_J$ for the current pixel value J is recalled from last occurrence pointer memory 140 (processing block 208). This last occurrence value $L_J$ is the address within linked-list memory 160 of the last occurrence of a pixel having the current pixel value. The current pixel address P is then stored in the linked-list memory 160 at the address corresponding to $L_J$ (processing block 209). This causes the memory location with the linked-list memory 160 corresponding to the previous last occurrence of the current pixel value to store the present pixel address. Thus this previous last occurrence pixel memory location points to the address of next pixel having the same pixel value, i.e., the current pixel value at the current pixel address.

In either case, the current pixel address P stored in the current pixel address memory 115 is stored in the last occurrence pointer memory 140 corresponding to the current pixel value J (processing block 210). As a consequence, the current pixel address becomes the last occurrence of the current pixel value. This is proper because the current pixel had this current pixel value.

Feature extractor logic 110 next increments the histogram number $H_J$ corresponding to the current pixel value stored within histogram memory 150. This serves to update the count of the number of pixels having the particular pixel value stored within histogram memory 150. Next the current pixel address P stored within current pixel address register 115 is incremented (processing block 212). This serves to ready the current pixel address memory 115 for receipt of the next pixel.

Feature extractor logic 110 next tests to determine whether or not additional pixels are to be received in the raster scan (decision block 213). If additional pixels in the scan are forthcoming then control returns to processing block 203 to receive the next pixel. If the scan is complete, that is no more pixels remain to be received, then program 200 is ended via end block 214.

Although program 200 illustrated in FIGS. 2a and 2b is of a sequence of operations, this is not necessary. If may be considered desirable to provide hardware within feature extractor logic 110 to perform some of the operations illustrated in FIGS. 2a and 2b in parallel. Thus a higher speed of operation may be achieved. In particular, it should be noted that storing the current pixel address P in the last occurrence pointer memory 140 at the memory location corresponding to the pixel value J, incrementing of the histogram memory 150 and incrementing of the current pixel address P stored in current pixel address memory 115 can operate substantially simultaneously.

A discussion will now be made of the relative dimensions for the memories illustrated in FIG. 1. To begin let us assume that the pixel array stored within pixel array 20 includes M rows of N columns, each pixel having K bits. First occurrence pointer memory 130, last occurrence pointer memory 140 and histogram memory 150 must include a memory location for each possible pixel value. Thus each of these memories must include $2^K$ memory locations. In addition, each memory location within these three memories must be able to specify a particular pixel among the array of pixels. Because there are M rows of N columns, these three memories must have a word length of at least $\log_2 (M*N)$. The current pixel address memory 115 must also include a pixel address word of this length.

Linked-list memory 160 must include memory locations having enough bits to specify one of the individual pixels. Thus the word length of linked-list memory 160 must be at least $\log_2 (M*N)$. In order for linked-list memory 160 to contain information on all the pixels within pixel array 20, linked-list memory 160 must include M*N memory locations. In many applications however, linked-list memory 160 need not have this many memory locations. In particular, if the number of pixels which fall within the set of pixel values of interest is limited, then linked-list memory 160 may be reduced in size. In addition, if a limited size of linked-list memory 160 is desired for economic or other reasons then some type of virtual memory system may be employed. That is, extraction of image data via feature extraction processor 100 may be suspended while the data within linked-list memory 160 is stored at another location. Typically central processing unit 10 would control the transfer of this data to another memory via common bus 90. This process may also involve clearing the first occurrence pointer memory 130, the last occurrence pointer memory 140, and the histogram memory 150. Once this memory process has taken place then feature extraction can continue. Such virtual memory techniques are known in the art and will not be fully described herein.

The memory sizes and operations for a image array having 2000 pixels by 2000 pixels of 8 bits each will now be discussed. The 2000 by 2000 array of pixels equals four million pixels. Twenty-two bits are required to specify one of these pixels. Thus current pixel address memory 115, first occurrence pointer member 130, last occurrence pointer member 140, histogram memory 150 and linked-list memory 160 must each include words of 22 bits. Because the pixel values are of 8 bits there are 256 possible pixel values. First occurrence pointer memory 130, last occurrence pointer memory 140 and histogram memory 150 therefore must include 256 of these 22-bit words. In order to contain the entire pixel array, linked-list memory 160 must include four million of these 22-bit words. Note that if the pixel values of interest specified by pixel value of interest memory 125 are less than the entire range of possible pixel values, then the required size of linked-list memory 160 would be reduced.

Figure 3:
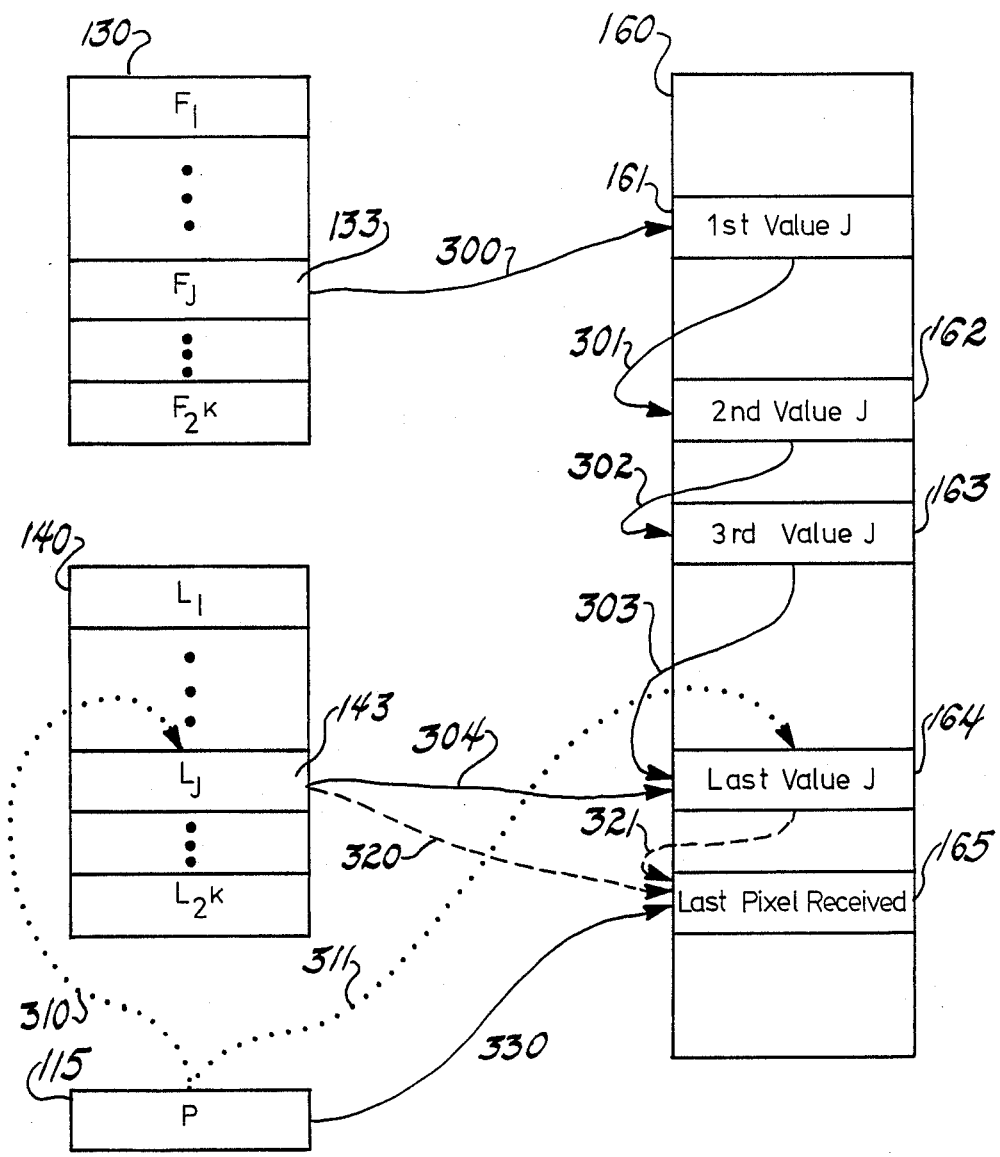
FIG. 3 illustrates the relationship among the values in the first occurrence memory, the last occurrence memory, the linked-list memory and the current pixel address memory in accordance with the apparatus illustrated in FIG. 1.

FIG. 3 illustrates the relationship between the data stored in first occurrence memory 130, last occurrence memory 140, current pixel address memory 115 and linked-list memory 160. Each memory location within first occurrence pointer memory 130 includes an address which points to a memory location within linked-list memory 160. For example, the address $F_J$ of the J-th pixel value stored within memory location 133 points to memory location 161 within linked-list memory 160. The memory location of memory word 161 within linked-list memory 160 corresponds to the memory location of the first pixel having the pixel value J within pixel array 20.

The data stored at this location 161 is an address to another memory location within linked-list memory 160. This memory location within linked-list memory 160 is the memory location 162. The address of memory location 162 corresponds to the address within pixel array 220 of the second occurrence of the pixel value J. The data stored in this memory location 162 in turn points to another, later memory location within linked-list memory 160. This is memory location 163, whose address corresponds to the location within pixel ray 20 of the third occurrence of a pixel having the pixel value J. The data stored within this memory location 163 in turn is the address of memory location 164.

In this example memory location 164 has an address corresponding to the last received pixel having the pixel value J within pixel array 20. Note that the address $L_J$ stored within last occurrence pointer memory 140 at memory location 143 is the address of this memory location 164. At all times during the processing of the raster scan data of the pixel array 20, current pixel address memory 115 stores a current pixel address P which points to the memory location 165 corresponding to the last pixel received. Thus there is a chain formed of links 300, 301, 302 and 303 from the memory location 133 of first occurrence memory 130 to memory locations 161, 162, 163 and 164 of linked-list memory 160. This chain enables an efficient tracing of all the pixels having the predetermined pixel value J throughout the entire linked-list memory 160 without the need for any search process.

When a new pixel having the pixel value J is received the current pixel address P is stored in both the last occurrence pointer memory 140 at location 143 and in the memory location 164 of linked-list memory 160 as illustrated by the dotted lines at 310 and 311, respectively. This transfer of the current pixel address P serves to add new links in the chain. Thus the data within memory location 164 now points to memory location 165, as illustrated schematically by dashed line 321. In addition, the address within memory location 143 of last occurrence memory 140 now also points to the memory location 165 of linked-list memory 160 as illustrated schematically by dashed line 130. The operation of feature extraction processor 100 is the construction of a plurality of such linked chains, one corresponding to each possible pixel value of interest.

Figure 4:
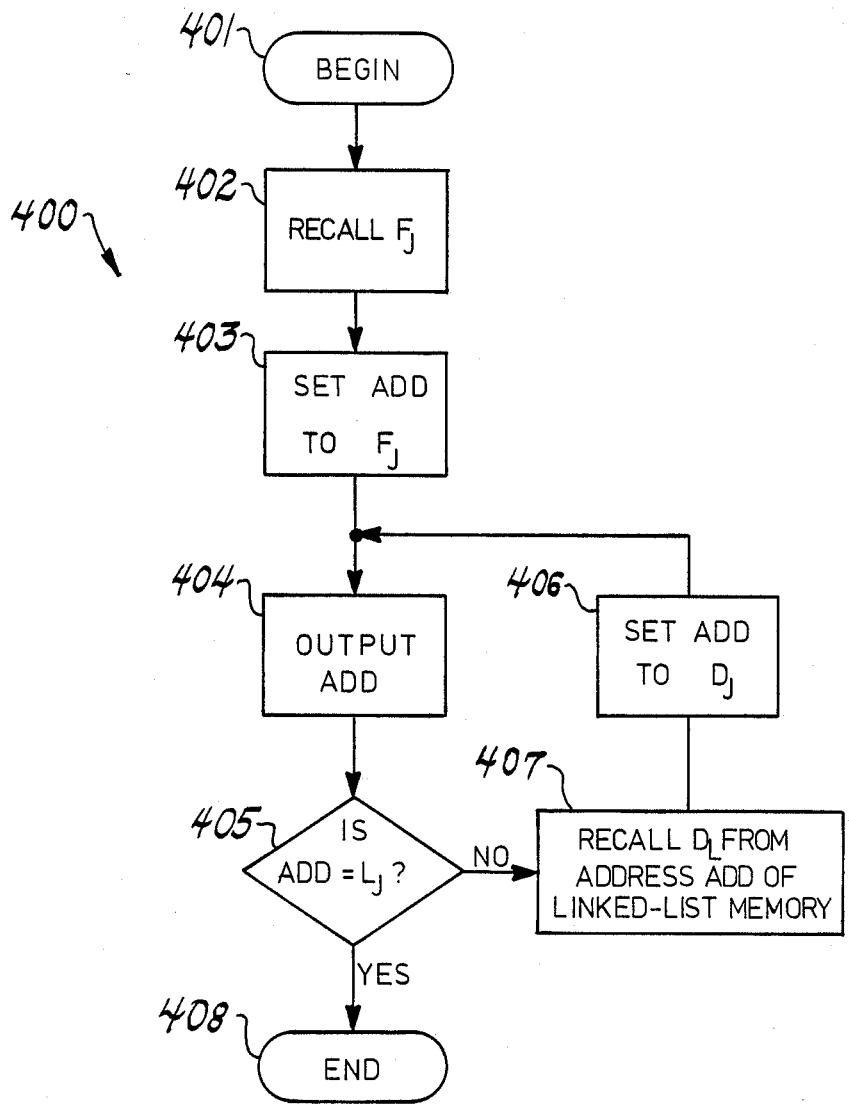
FIG. 4 illustrates a program for generation of a list of pixels having a predetermined value from the linked-list memory illustrated in FIG. 1.

Program 400 illustrated in FIG. 4 shows how a list of the sequence of pixels having a predetermined pixel value can be constructed from the first occurrence pointer memory 130, last occurrence pointer memory 140 and the linked-list memory 160. Program 400 is begun at start block 401. Firstly, the address $F_J$ stored within the first occurrence pointer memory 130 corresponding to the particular selected pixel value is recalled (processing block 402). As illustrated in FIG. 3 this address $F_J$ is stored within memory location 133. Next, an address ADD is set equal to this recalled address $F_J$ (processing block 403). This address ADD is then output, beginning the sequence of pixels having the pixel value J (processing block 404). As shown in FIG. 3 address ADD is the address of memory location 161 within linked-list memory 160. This address ADD also indicates a particular pixel within pixel array 20. In this case, address ADD indicates the first pixel within the pixel array 20 having the pixel value J.

Program 400 next tests to determine whether or not the current address ADD equals the last occurrence address $L_J$ for that particular pixel value J (decision block 405). This test determines whether or not the last output pixel address ADD corresponds to the last pixel in the chain. If this is not the case, then the data $D_L$ stored in the address ADD of the linked-list memory 160 is recalled (processing block 406). This is equivalent to following the chain 301 between memory location 161 and memory location 162 illustrated in FIG. 3. Next, the address ADD is set to this data $D_L$ (processing block 407). This sets up the process for following the next link in the chain. Control then returns to processing block 404 in which this new address ADD is output. The process remains in this loop until the address ADD equals the last occurrence address $L_J$ for the pixel value J. At that time the process is complete and is ended via end block 407.

The program 400 illustrated in FIG. 4 can be executed via central processing unit 10 by accessing linked-list memory 160 directly via common 90. Alternately, feature extraction processor 100 may also include circuits to perform this function.

As an alternative embodiment, feature extraction processor 100 may operate on ranges of pixel values rather than the pixel values themselves. In this alternative embodiment pixel value of interest memory 125 stores an indication of a plurality of pixel value ranges. The pixel value ranges must be mutually exclusive, that is, each possible pixel value may only be in a single pixel range. Each pixel value range includes at least one of the possible pixel values. The pixel value comparator 120 compares the current pixel value with the pixel value ranges stored in pixel value of interest memory 125. Pixel value comparator 120 sends a signal to feature extractor logic 110 which indicates whether the current pixel value of the current pixel is within the pixel values of interest stored in pixel value of interest memory 125. If the current pixel has a pixel value of interest, then pixel value comparator 120 also signals feature extractor logic 110 the range of pixels which includes the pixel value of the current pixel.

Other portions of feature extraction processor 100 operate as described above, except that pixels are classified by their pixel value range rather than their pixel value. First occurrence pointer memory 130, last occurrence pointer memory 140 and histogram memory 150 are organized in terms of pixel value ranges rather than pixel values. Thus each memory location within first occurrence pointer memory 130 stores the pixel address of the first occurrence of a pixel having a pixel value within the corresponding pixel value range. Likewise, each memory location of last occurrence pointer memory 150 stores the pixel address of the last received pixel having a pixel value within the corresponding range of pixel values. Histogram memory 150 stores in respective memory locations the number of previously received pixels having pixel values within corresponding ranges. Because each range of pixel values will typically include more than one pixel value, the number of pixel value ranges will be less than the number of pixel values. Thus the number of memory locations required within first occurrence pointer memory 130, last occurrence pointer memory 140 and histogram memory 150 will be correspondingly reduced. Unless the pixel values of interest are less than the total possible pixel values, the memory size required for linked-list memory 160 is unchanged.

The linked chains within linked-list memory 160 are based upon pixel value ranges in this alternative embodiment. Each chain within linked-list memory 160 links pixel addresses of pixels having a pixel value within a corresponding pixel value range. A sequence of pixel addresses of pixels having pixel values in a selected range of pixel values can be easily constructed in this embodiment in the same manner as illustrated in FIG. 4.

This alternative embodiment may be valuable in certain cases. In particular if the number of possible pixel values is greater than the number of useful ranges, this alternative technique is advantageous. Often the image data will include greater precision in pixel value than is needed for the desired analysis. In such a case this alternative technique should be used. Note that the size of the pixel value ranges need not be equal. So long as pixel value comparator 120 can determine which pixel range includes any received pixel, the pixel ranges can be of varying sizes.

I claim:

1. A linked-list image feature extractor for an image of a planar array of pixels, each pixel having a pixel value selected from a plurality of of possible pixel values, comprising:
   an input means for receiving a sequence of pixels corresponding to a raster scan of said planar array of pixels;
   a current pixel address memory for storing therein a current pixel address corresponding to the number of previously received pixels;
   a linked-list memory having a plurality of memory locations, for storing in each memory location an address within said linked-list memory;

a first occurrence pointer memory having a plurality of memory locations, for storing in each memory location a first occurrence address within said linked-list memory equal to the address of the first received pixel of said sequence of pixels having a corresponding pixel value;

a last occurrence pointer memory having a plurality of memory locations, for storing in each memory location a last occurrence address within said linked-list memory equal to the address of the last received pixel of said sequence of pixels having a corresponding pixel value;

a feature extraction logic circuit connected to said input means, said current pixel address memory, said linked-list memory, said first occurrence pointer memory and said last occurrence pointer memory for receiving said sequence of pixels, determining whether the current pixel value of the current pixel is the first occurrence within said sequence of pixels of said current pixel value, storing said current pixel address in said memory location within said first occurrence pointer memory corresponding to said current pixel value if said current pixel is the first occurrence of said current pixel value, storing the current pixel address in said memory location within said last occurrence address memory corresponding to the current pixel value, storing said current pixel address in said memory location within said linked-list memory of said last occurrence address corresponding to said current pixel value if said current pixel is not the first occurrence of said current pixel value, and incrementing said current pixel address memory.

2. A linked-list image feature extractor as claimed in claim 1, further comprising:

a histogram memory connected to said feature extraction logic circuit having a plurality of memory locations, for storing in each memory location a number of pixels;

said feature extraction logic further includes means for incrementing the number stored in a memory location within said histogram memory corresponding to said current pixel value, and wherein the determining of whether the current pixel value is the first occurrence of said current pixel value is achieved by determining whether the number stored in said memory location of said histogram memory corresponding to said current pixel value is zero.

3. A linked-list image feature extractor as claimed in claim 1, further comprising:

a pixel value of interest memory connected to said feature extractor logic circuit for storing therein an indication of a predetermined set of pixel values within said planar array of pixels which are of interest; and a pixel value compare circuit connected to said input means, said feature extraction logic circuit and said pixel value of interest memory for comparing said current pixel value with said predetermined set of pixel values and inhibiting said feature extraction logic circuit if said current pixel value is not within said predetermined set of pixel values.

4. A linked-list image feature extractor as claimed in claim 1, further comprising:

a pixel list extractor connected to said first occurrence pointer memory and said linked-list memory for extracting a list of all pixels within said pixel array having a selected pixel value by recalling said first occurrence address stored in the memory location of said first occurrence pointer memory corresponding to said selected pixel value, recalling said address stored in said linked-list memory at the memory location corresponding to said first occurrence address, and sequentially recalling the address stored in said linked-list memory at the memory location corresponding to the address recalled from the previous memory location within said linked-list memory, the sequence of said recalled addresses being said list of all pixels within said pixel array having said selected pixel value.

5. A linked-list image feature extractor for an image of a planar array of pixels, each pixel having a pixel value selected from a plurality of of possible pixel values, comprising:

an input means for receiving a sequence of pixels corresponding to a raster scan of said planar array of pixels;

a pixel value of interest memory for storing therein an indication of a plurality of mutually exclusive pixel value ranges, each pixel value range including at least one of said plurality of possible pixel values;

a pixel value compare circuit connected to said input means and said pixel value of interest memory for comparing said current pixel value with said plurality of pixel value ranges and indicating said current pixel value range which includes said current pixel value;

a current pixel address memory for storing therein a current pixel address corresponding to the number of previously received pixels;

a linked-list memory having a plurality of memory locations, for storing in each memory location an address within said linked-list memory;

a first occurrence pointer memory having a plurality of memory locations, for storing in each memory location a first occurrence address within said linked-list memory equal to the address of the first received pixel of said sequence of pixels having a pixel value within a corresponding pixel value range;

a last occurrence pointer memory having a plurality of memory locations, for storing in each memory location a last occurrence address within said linked-list memory equal to the address of the last received pixel of said sequence of pixels having a pixel value within a corresponding pixel value range;

a feature extraction logic circuit connected to said input means, said pixel value compare circuit, said current pixel address memory, said linked-list memory, said first occurrence pointer memory and said last occurrence pointer memory for receiving said sequence of pixels, determining whether the current pixel value of the current pixel is the first occurrence within said sequence of pixels of said the corresponding pixel value range, storing said current pixel address in said memory location within said first occurrence pointer memory corresponding to said current pixel value range if said current pixel is the first occurrence of said current pixel value range, storing the current pixel address in said memory location within said last occurrence address memory corresponding to the current pixel value range, storing said current pixel address in said memory location within said linked-list memory of said last occurrence address corresponding to said current pixel value range if said current pixel is not the first occurrence of said current pixel value range, and incrementing said current pixel address memory.

6. A linked-list image feature extractor as claimed in claim 5, further comprising:
a histogram memory connected to said feature extraction logic circuit having a plurality of memory locations, for storing in each memory location a number of pixels;
said feature extraction logic further includes means for incrementing the number stored in a memory location within said histogram memory corresponding to said current pixel value range, and wherein the determining of whether the current pixel value is the first occurrence of said current pixel value range is achieved by determining whether the number stored in said memory location of said histogram memory corresponding to said current pixel value range is zero.

7. A linked-list image feature extractor as claimed in claim 5, further comprising:
a pixel list extractor connected to said first occurrence pointer memory and said linked-list memory for extracting a list of all pixels within said pixel array having a selected pixel value range by recalling said first occurrence address stored in the memory location of said first occurrence pointer memory corresponding to said selected pixel value range, recalling said address stored in said linked-list memory at the memory location corresponding to said first occurrence address, and sequentially recalling the address stored in said linked-list memory at the memory location corresponding to the address recalled from the previous memory location within said linked-list memory, the sequence of said recalled addresses being said list of all pixels within said pixel array having said selected pixel value range.

8. A method of extracting feature information from an image of a planar array of pixels, each pixel having a pixel value selected from a plurality of possible pixel values, comprising the steps of:
recalling said planar array of pixels one pixel at a time in a raster scan sequence;
incrementing a current pixel address memory upon receipt of each pixel, whereby a current pixel address indicative of the number of previously received pixels in said sequence of pixels is stored therein;
determining whether the current pixel value of the current pixel is the first occurrence of said current pixel value within said sequence of pixels;
storing the current pixel address in a memory location within a first occurrence pointer memory corresponding to said current pixel value if said current pixel is the first occurrence of said current pixel value within said sequence of pixels;
storing the current pixel address in a linked-list memory at a memory location corresponding to the pixel address stored in the memory location of a last occurrence pointer memory corresponding to said current pixel value; and
storing the current pixel address in a memory location within said last occurrence pointer memory corresponding to said current pixel value.

9. The method of extracting feature information from an image as claimed in claim 8, further comprising the steps of:
incrementing a count stored in a historgram memory at a memory location corresponding to said current pixel value, whereby a count indicative of the number of previously received pixels in said sequence of pixels for each pixel value is stored therein; and
said step of determining whether the current pixel value of the current pixel is the first occurrence of said pixel value is achieved by determining whether the count stored in the memory location of said histogram memory corresponding to the current pixel value is zero.

10. The method of extracting feature information from an image as claimed in claim 8, further comprising the steps of:
determining whether the current pixel value of the current pixel is within a predetermined set of pixel values of interest; and
inhibiting said steps of storing the current pixel address in said first occurrence pointer memory, storing the current pixel address in said last occurrence pointer memory and storing the current pixel address in said linked-list memory if said current pixel value of said current pixel is not within said predetermined set of pixel values of interest.

11. The method of extracting feature information as claimed in claim 8, further comprising the steps of:
recalling the first occurrence address stored in said first occurrence pointer memory at a memory location corresponding to a predetermined pixel value;
recalling the address stored in said linked-list memory at a memory location corresponding to said first occurrence address;
sequentially recalling the address stored in said linked-list memory at the memory location corresponding to the last recalled address from said linked-list memory until the memory location equal to the address stored in said last occurrence pointer memory for said predetermined pixel value is reached;
wherein the sequence of addresses recalled from said linked-list memory correspond to all pixels within said pixel array having said predetermined pixel value.

12. A method of extracting feature information from an image of a planar array of pixels, each pixel having a pixel value selected from a plurality of possible pixel values, comprising the steps of:
recalling said planar array of pixels one pixel at a time in a raster scan sequence;
incrementing a current pixel address memory upon receipt of each pixel, whereby a current pixel address indicative of the number of previously received pixels in said sequence of pixels is stored therein;
determining whether the current pixel value of the current pixel is the first occurrence of one of a plurality of mutually exclusive pixel value ranges within said sequence of pixels, each pixel value range including at least one of said plurality of pixel values;
storing the current pixel address in a memory location within a first occurrence pointer memory corresponding to said current pixel value range if said current pixel is the first occurrence of said current pixel value range within said sequence of pixels;

storing the current pixel address in a memory location within said last occurrence pointer memory corresponding to said current pixel value range; and storing the current pixel address in a linked-list memory at a memory location corresponding to the pixel address stored in the memory location of a last occurrence pointer memory corresponding to said current pixel value range.

13. The method of extracting feature information from an image as claimed in claim 12, further comprising the steps of:

incrementing a count stored in a historgram memory at a memory location corresponding to said current pixel value range, whereby a count indicative of the number of previously received pixels in said sequence of pixels for each pixel value range is stored therein; and said step of determining whether the current pixel value of the current pixel is the first occurrence of said curent pixel value range is achieved by determining whether the count stored in the memory location of said histogram memory corresponding to the current pixel value range is zero.

14. The method of extracting feature information from an image as claimed in claim 12, further comprising the steps of:

determining whether the current pixel value of the current pixel is within a predetermined set of pixel values of interest;

inhibiting said steps of storing the current pixel address in said first occurrence pointer memory, storing the current pixel address in said last occurrence pointer memory and storing the current pixel address in said linked-list memory if said current pixel value of said current pixel is not within said predetermined set of pixel values of interest.

15. The method of extracting feature information as claimed in claim 12, further comprising the steps of:

recalling the first occurrence address stored in said first occurrence pointer memory at a memory location corresponding to a predetermined pixel value range;

recalling the address stored in said linked-list memory at a memory location corresponding to said first occurrence address;

sequentially recalling the address stored in said linked-list memory at the memory location corresponding to the last recalled address from said linked-list memory until the memory location equal to the address stored in said last occurrence pointer memory for said predetermined pixel value range is reached;

wherein the sequence of addresses recalled from said linked-list memory correspond to all pixels within said pixel array having said predetermined pixel value.

* * * * *